(12) United States Patent
Mitsuki

(10) Patent No.: US 8,218,242 B2
(45) Date of Patent: Jul. 10, 2012

(54) ZOOM LENS AND OPTICAL APPARATUS EQUIPPED WITH THIS ZOOM LENS

(75) Inventor: Shinichi Mitsuki, Kawasaki (JP)

(73) Assignee: Nikon Corporation, Tokyo (JP)

( * ) Notice: Subject to any disclaimer, the term of this patent is extended or adjusted under 35 U.S.C. 154(b) by 256 days.

(21) Appl. No.: 12/394,102

(22) Filed: Feb. 27, 2009

(65) Prior Publication Data

US 2009/0225437 A1    Sep. 10, 2009

(30) Foreign Application Priority Data

Mar. 3, 2008    (JP) .................. 2008-052610

(51) Int. Cl.
*G02B 15/14*    (2006.01)
(52) U.S. Cl. ....................... 359/682; 359/689
(58) Field of Classification Search .......... 359/680–682, 359/689
See application file for complete search history.

(56) References Cited

U.S. PATENT DOCUMENTS

| 7,092,170 B2 | 8/2006 | Satori | |
| 2007/0285800 A1* | 12/2007 | Shimada | 359/680 |
| 2008/0151385 A1* | 6/2008 | Ohashi | 359/689 |

FOREIGN PATENT DOCUMENTS

| CN | 101097289 A | 1/2008 |
| CN | 101191898 A | 6/2008 |
| EP | 1 873 569 A1 | 2/2008 |
| JP | 2004-102211 A | 4/2004 |
| JP | 2005-316333 A | 11/2005 |
| JP | 2007-065514 A | 3/2007 |
| JP | 2007-248796 A | 9/2007 |

OTHER PUBLICATIONS

Chinese Office Action issued Oct. 25, 2011 in Appln. No. 200910118257.6.

* cited by examiner

*Primary Examiner* — Scott J Sugarman
(74) *Attorney, Agent, or Firm* — Miles & Stockbridge P.C.

(57) ABSTRACT

A zoom lens of the present invention has a first lens group having negative refractive power, a second lens group having positive refractive power, and a third lens group having positive refractive power, which are disposed in order from an object, wherein the distances between each lens group are changed upon zooming, the second lens group has at least two positive lenses having an aspherical surface respectively, and when vd is an Abbe number at least one of the positive lenses having the aspherical surface satisfies a condition of the following expression: vd>70.

23 Claims, 14 Drawing Sheets

Example 1

*Fig. 2*
Example 1
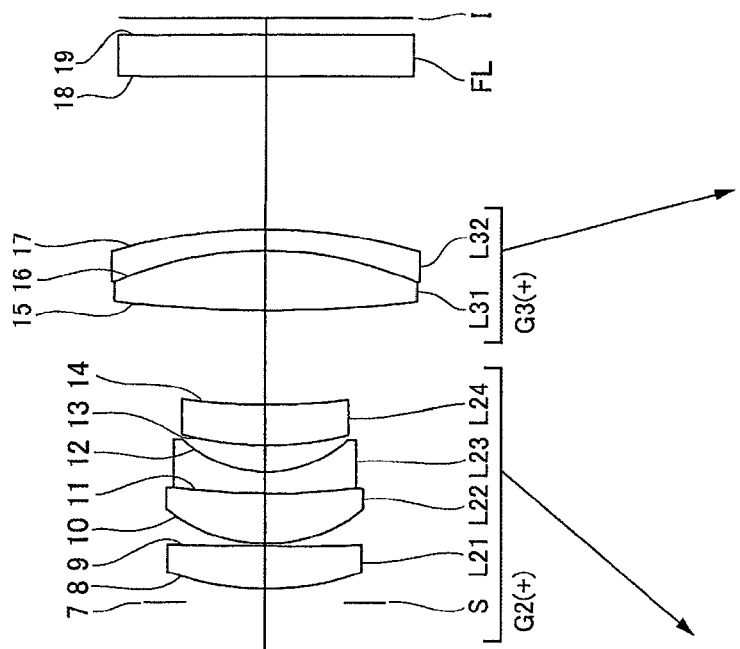
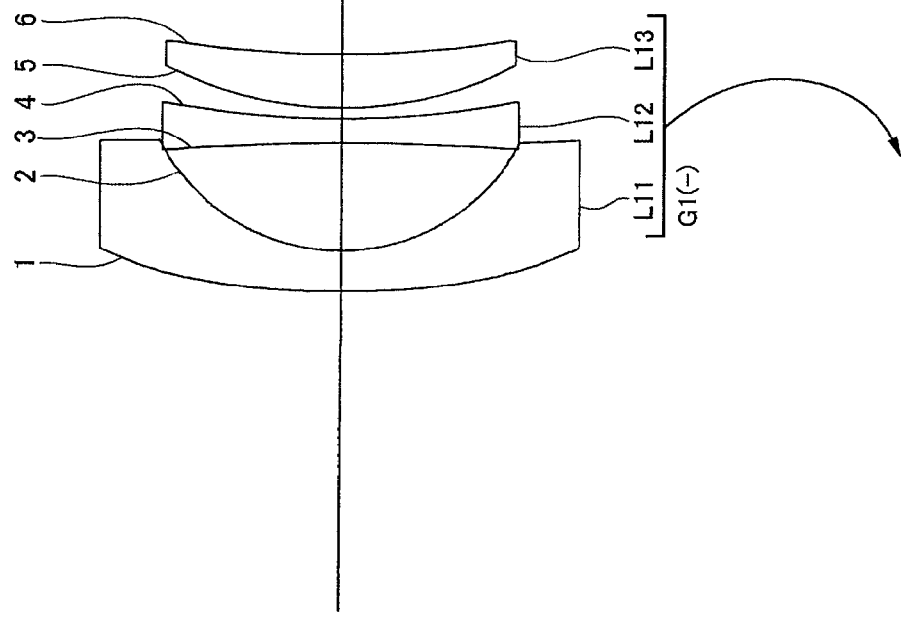

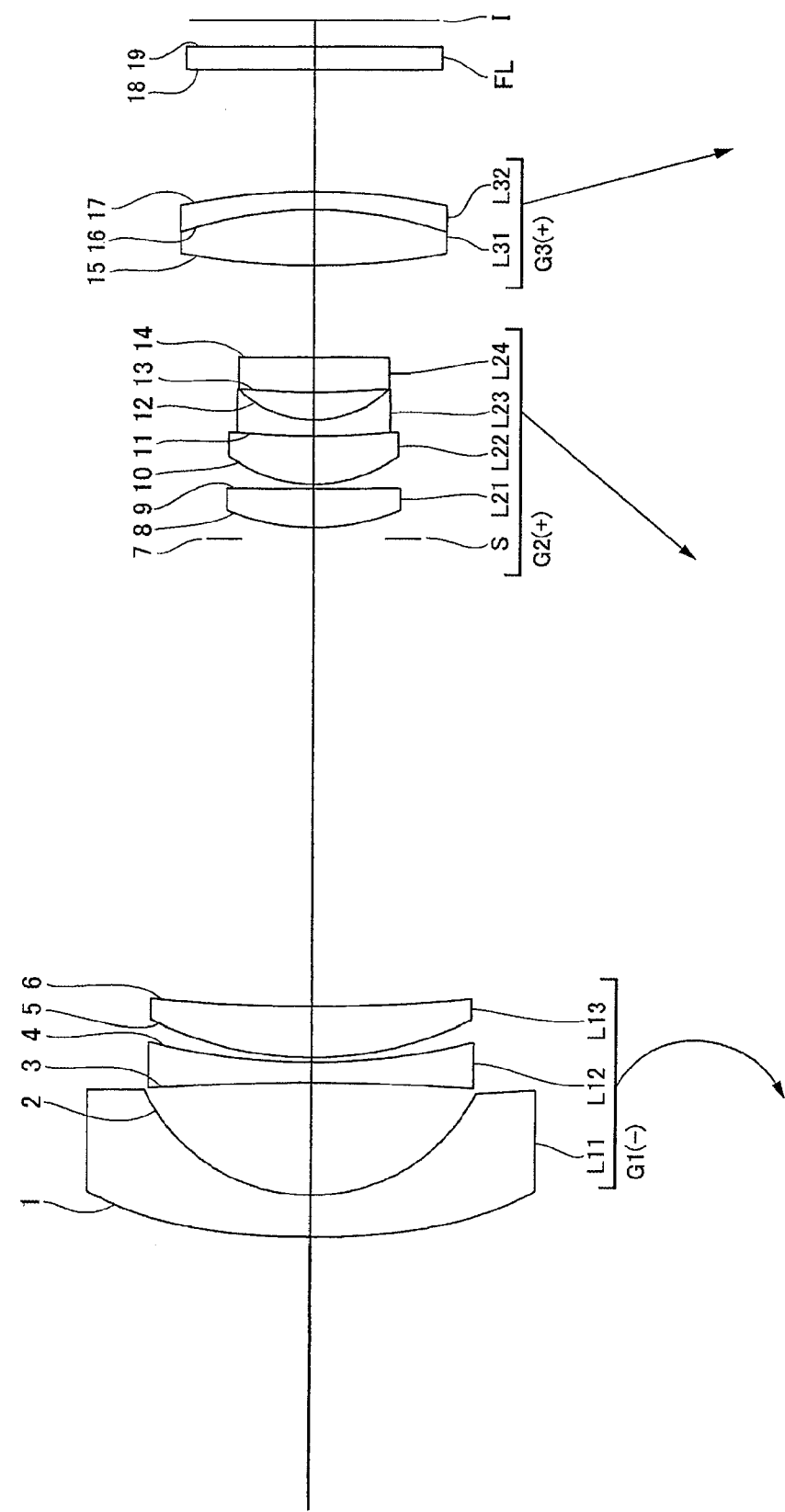

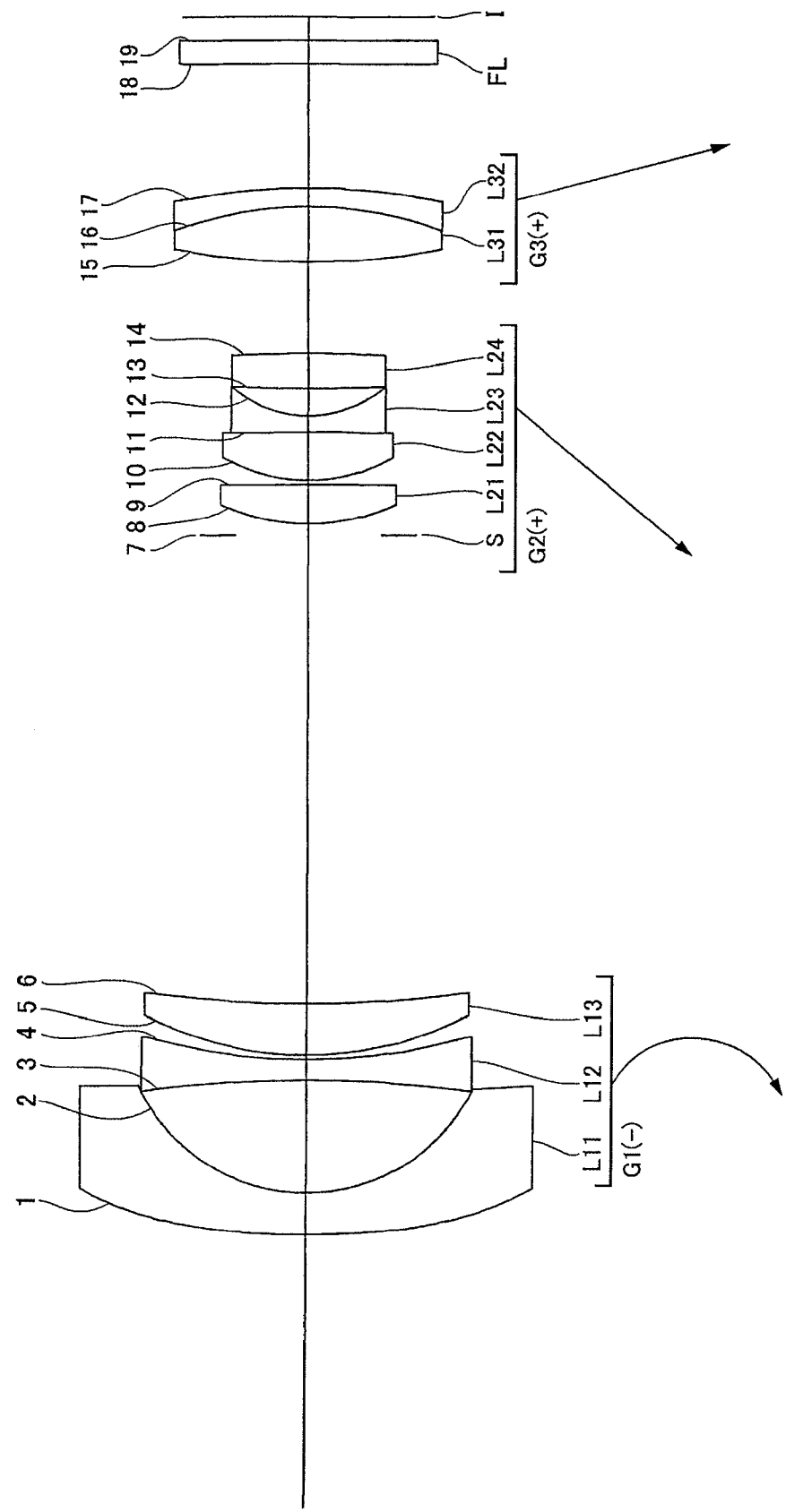

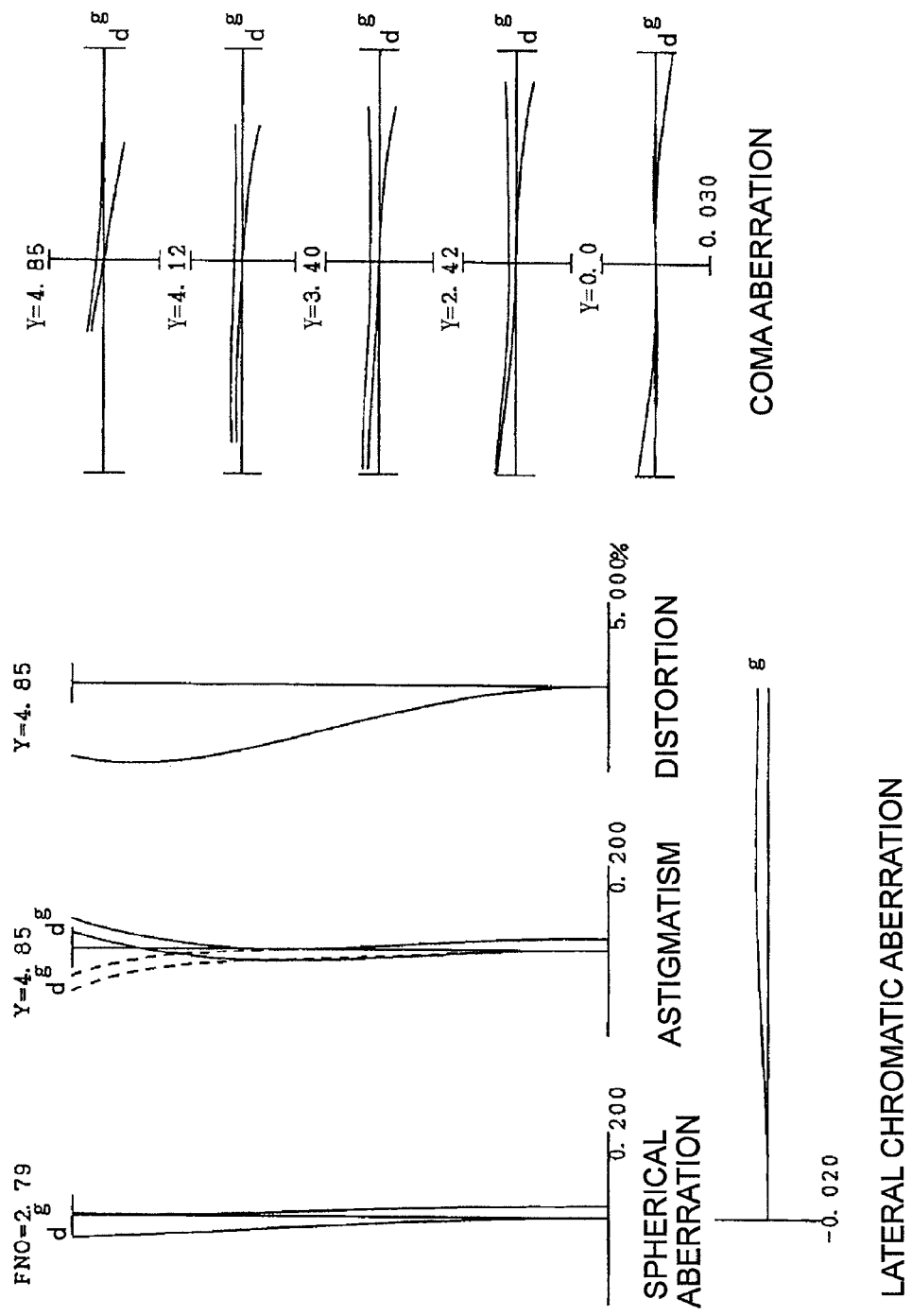

ZOOM LENS AND OPTICAL APPARATUS EQUIPPED WITH THIS ZOOM LENS

INCORPORATION BY REFERENCE

This invention claims the benefit of Japanese Patent Application No. 2008-052610 which is hereby incorporated by reference.

FIELD OF THE INVENTION

The present invention relates to a zoom lens suitable for a camera using an electronic image sensing element, such as a digital still camera and video camera, and to an optical apparatus equipped with this zoom lens.

BACKGROUND OF THE INVENTION

Recently in digital cameras, a zoom lens that includes wide angle areas, which can photograph wider ranges, are being used. For example, a zoom lens comprised of a first lens group having negative refractive power, a second lens group having positive refractive power, and a third lens group having positive refractive power, which are disposed in order from an object, has been proposed (e.g. Japanese Patent Application Laid-Open No. 2007-065514).

SUMMARY OF THE INVENTION

Recently, while such solid state image sensing devices as CCD and CMOS have become highly integrated, higher image forming performance is demanded for camera lenses to support high pixelation. In conventional zoom lenses, however, the angle of view in the telephoto end state is wide, but the variable power ratio is small and the focal length at the telephoto side is insufficient. Optical performance thereof is not sufficient either, and cannot support highly integrated solid state image sensing device.

With the foregoing in view, it is an object of the present invention to provide a compact and high performance zoom lens which can implement high variable power, and an optical apparatus equipped with this zoom lens.

MEANS TO SOLVE THE PROBLEMS

To achieve this object, a zoom lens of the present invention comprises, in order from an object, a first lens group having negative refractive power, a second lens group having positive refractive power, and a third lens group having positive refractive power. Further, a distance between each lens group is changed upon zooming, the second lens group has at least two positive lenses having an aspherical surface respectively, and at least one of the positive lenses having the aspherical surface satisfies the conditional expression: $vd>70$, where $vd$ is an Abbe number.

An optical apparatus of the present invention has a zoom lens according to the above mentioned configuration.

ADVANTAGEOUS EFFECTS OF THE INVENTION

According to the present invention, a compact and high performance zoom lens which can implemented high variable power, and an optical apparatus equipped with this zoom lens, can be provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 1A is a front view, FIG. 1B is a rear view, and FIG. 1C is a cross-sectional view along the A-A' line in FIG. 1A;

FIG. 2 is a diagram depicting a configuration and zoom locus of a zoom lens according to Example 1;

FIG. 4 is a diagram depicting a configuration and zoom locus of a zoom lens according to Example 2;

FIG. 6 is a diagram depicting a configuration and zoom locus of a zoom lens according to Example 3;

DESCRIPTION OF THE PREFERRED EMBODIMENTS

Figure 1:
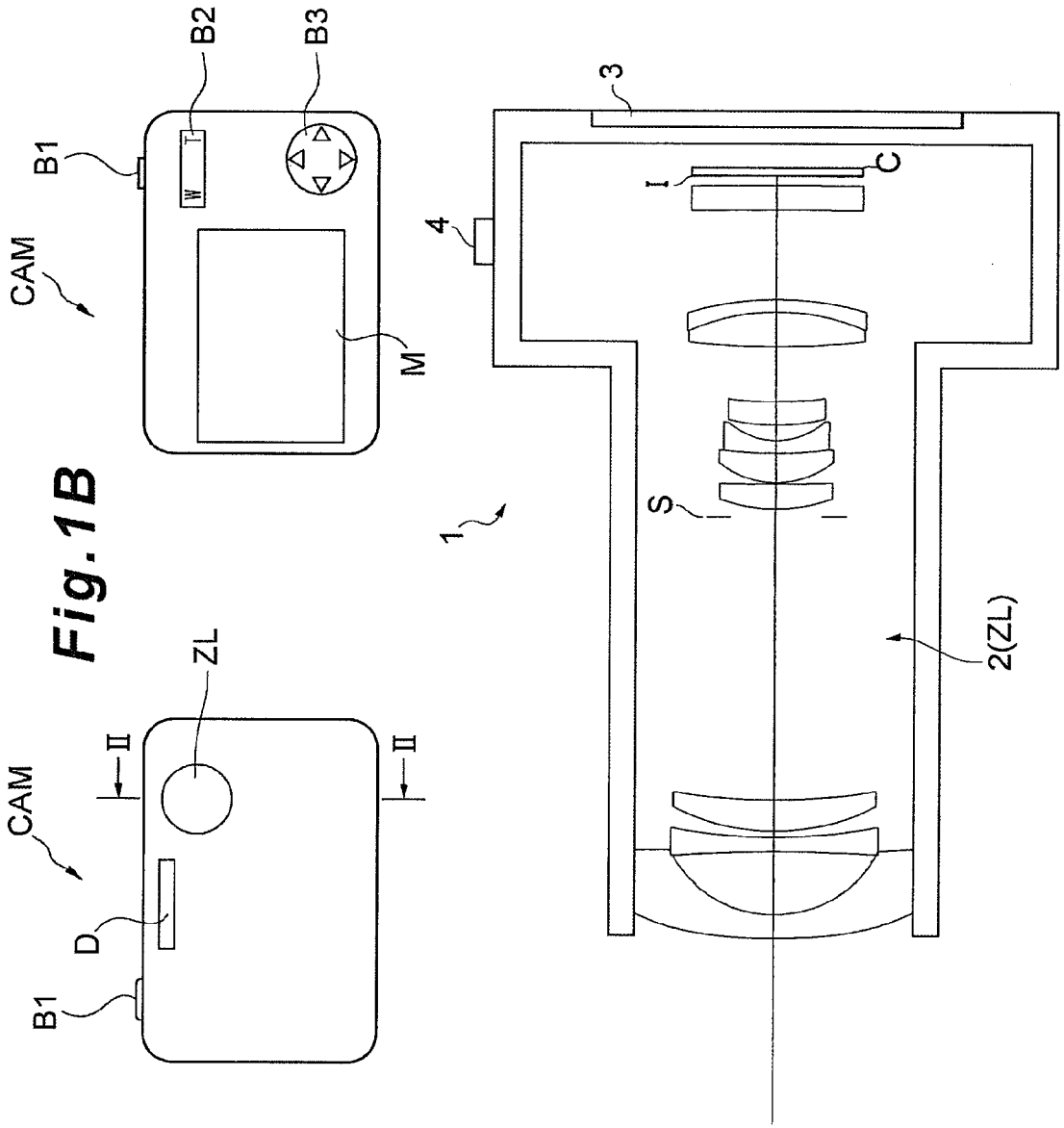
FIG. 1 is a diagram depicting an electronic still camera (optical apparatus) according to the present embodiment, where

Preferred embodiments of the present invention will now be described with reference to the drawings. FIG. 1 shows an electronic still camera equipped with a later mentioned zoom lens according to the embodiment, where FIG. 1A is a front view, and FIG. 1B is a rear view. FIG. 1C is a cross-sectional view along the A-A' line in FIG. 1A.

In the electronic still camera 1 in FIG. 1, when an unillustrated power button is pressed, an unillustrated shutter of a camera lens 2 is opened, and lights from an unillustrated object are condensed by the camera lens 2, and an image is formed on an image sensing device C (e.g. CCD, CMOS) disposed on an image plane I. The object image formed on the image sensing device C is displayed on a liquid crystal monitor 3 disposed in the back of the electronic still camera 1. A user determines a composition of the object image while viewing the liquid crystal monitor 3, then pushes a release button 4 down to shoot the object image by the image sensing device C, and records and stores the image in an unillustrated memory.

The camera lens 2 is the later mentioned zoom lens ZL according to the present embodiment. In the electronic still camera 1, an auxiliary light emission unit 5 which emits auxiliary light when the object is dark, a wide (W)-tele (T) button 6 which zooms a lens system 2, that is the camera lens 2 from the wide-angle end state (W) to the telephoto end state (T), and a function button 7 which is sued for setting various conditions of the electronic still camera 1, are disposed. In this way, the electronic still camera 1 enclosing the later mentioned zoom lens ZL according to the present embodiment is constructed.

As mentioned above, the zoom lens ZL according to the present embodiment, used as the camera lens 2, is comprised of a first lens group G1 having negative refractive power, a second lens group G2 having positive refractive power, and a third lens group G3 having a positive refractive power, which are disposed in order from an object.

In the zoom lens ZL, when a focal length changes (zooms) from the wide-angle end state to the telephoto end state, the first lens group G1 is moved in a convex locus facing the image, the second lens group G2 is moved toward the object, and the third lens group G3 is moved toward the image, so that the distance between the first lens group G1 and the second lens group G2 decreases, and the distance between the second lens group G2 and the third lens group G3 increases (see FIG. 2).

An aperture stop S for adjusting quantity of light is disposed between the first lens group G1 and the second lens group G2, and the aperture stop S is moved together with the second lens group G2 upon zooming from the wide-angle end state to the telephoto end state. By this configuration, the lens diameter of the first lens group G1 can be decreased, and the position of an exit pupil can be distant from the image plane.

A filter FL to cut the wavelength in an infrared band is disposed between the zoom lens ZL and the image plane I (image sensing device).

The zoom lens ZL according to the present embodiment is a negative-lead type zoom lens in which a lens group having negative refractive power disposed closest to the object side, that is the first lens group G1, is disposed.
Because of this, the height of the maximum angle of view ray from the optical axis in the wide-angle end state can be deceased. So a diameter of the front lens, that is the lens positioned closest to the object, can be decreased.

In the above mentioned zoom lens ZL having a negative-positive-positive lens group configuration, zooming from the wide-angle end state to the telephoto end state is largely performed by changing the image forming magnification of the second lens group G2, so if the aberrations in the second lens group G2 are not well corrected, aberration fluctuation due to zooming becomes a major issue, and increasing the variable power ratio becomes difficult. Also in the telephoto end state where the magnification of the second lens group G2 is high, the relative sensitivity of each lens in the second lens group G2 verses the decentering becomes high, and a performance drop due to manufacturing dispersion increases. Therefore at least two positive lenses having an aspherical surface respectively are disposed in the second lens group G2, whereby correction of spherical aberration, coma aberration and curvature of field can be distributed to these aspherical surfaces respectively, and aberration fluctuation due to zooming can be decreased even if the variable power ratio is increased. Performance deterioration due to decentering of the aspherical lens can also be decreased.

It is preferable that one of at least two positive lenses having the aspherical surface disposed in the second lens group is disposed closest to the image in the second lens group G2. By this configuration, the coma aberration and astigmatism in the wide-angle end state can be effectively corrected, and good optical performance can be implemented.

It is also preferable that the second lens group G2 has a first positive lens, a cemented lens and a second positive lens, which are disposed in order from the object. By this configuration, spherical aberration, axial chromatic aberration and lateral chromatic aberration can be well corrected.

It is preferable that the third lens group is moved facing the image upon zooming from the wide-angle end state to the telephoto end state. By this configuration, the variable power ratio can be increased without increasing the size of the zoom lens ZL, and astigmatism in the intermediate focal length state in zooming can be appropriately corrected.

It is preferable that the third lens group G3 is a cemented lens of a positive lens and a negative lens. By making the third lens group G3 a cemented lens, lateral chromatic aberration can be well corrected in the entire area of zooming.

It is also preferable that the third lens group G3 is a focusing lens group. By this, aberration fluctuation upon focusing can be effectively suppressed.

In the zoom lens ZL having the above configuration, it is preferable that at least one of the at least two positive lenses having the aspherical surface in the second lens group G2 satisfies a condition of the following expression (1)

$$\nu d > 70 \qquad (1)$$

where $\nu d$ is an Abbe number.

The above condition expression (1) is for appropriately specifying an Abbe number of a material of the positive lens having the aspherical surface in the second lens group G2. By at least one of the positive lenses having the aspherical surface in the second lens group G2 satisfying the condition expression (1) like this, axial chromatic aberration and lateral chromatic aberration in the telephoto end state can be decreased, and good optical performance with high contrast can be implemented. In order to insure the effect of the present embodiment, it is preferable that the lower limit value of the conditional expression (1) is 75. It is even more preferable that the lower limit value of the conditional expression (1) is 80.

In the zoom lens ZL according to the present embodiment, it is preferable that the lens disposed closest to the image in the second lens group G2 satisfies a condition of the following expression (2), $$\nu dL > 70 \qquad (2)$$

where $\nu dL$ is an Abbe number.

The above conditional expression (2) is for appropriately specifying an Abbe number of a material of the image side lens in the second lens group G2. By satisfying the conditional expression (2), the chromatic coma aberration in the wide-angle end state can be decreased, and good optical performance can be implemented. In order to insure the effect of the present embodiment, it is preferable that the lower limit value of the conditional expression (2) is 75. It is even more preferable that the lower limit value of the conditional expression (2) is 80.

In the zoom lens ZL according to the present embodiment, it is preferable that a condition of the following expression (3)

$$0.1 < f2/f2L < 0.6 \qquad (3)$$

is satisfied, where f2 is a focal length of the second lens group G2, and f2L is a focal length of the lens which is disposed closest to the image in the second lens group G2.

The above conditional expression (3) is for appropriately specifying a relationship of a focal length f2 of the second lens group G2 and a focal length f2L of the lens which is disposed closest to the image in the second lens group G2. By satisfying the conditional expression (3), good optical performance can be implemented throughout all areas of zooming. If the lower limit value of the conditional expression (3) is not reached, the refractive power of the lens disposed closest to the image, with respect to the entire second lens group G2, decreases, and the function of the aspherical surface decreases, and coma aberration and astigmatism worsen. In order to insure the effect of the present embodiment, it is preferable that the lower limit value of the conditional expression (3) is 0.2.

If the upper limit value of the conditional expression (3) is exceeded, on the other hand, the refractive power of the lens which is closest to the image in the second lens group G2 increases, and the principle point position of the second lens group G2 moves to the image side, so high variable power cannot be implemented. Also the spherical aberration in the telephoto end state worsens. In order to insure the effect of the present embodiment, it is preferable that the upper limit value of the conditional expression (3) is 0.4.

In the zoom lens ZL according to the present embodiment, it is preferable that a condition of the following expression (4)

$$-0.5 < f2/f2c < 0.5 \quad (4)$$

is satisfied, where f2 is a focal length of the second lens group G2, and f2c is a focal length of a cemented lens of the second lens group G2.

The above conditional expression (4) is for appropriately specifying a relationship of a focal length f2 of the second lens group G2 and a focal length f2c of the cemented lens of the second lens group G2. By satisfying the conditional expression (4), good optical performance with less performance deterioration due to manufacturing dispersion can be implemented. If the lower limit value of the conditional expression (4) is not reached, the negative refractive power of the cemented lens increases, and deterioration of performance due to decentering, particularly decentering coma aberration in the telephoto end state increases, which makes it impossible to maintain good optical performance. Also in order to insure the effect of the present enbodiment, it is preferable that the lower limit value of the conditional expression (4) is −0.4.

If the upper limit value of the conditional expression (4) is exceeded, on the other hand, the positive refractive power of the cemented lens increases, and chromatic aberration and spherical aberration cannot be corrected throughout the entire area of zooming. In order to insure the effect of the present embodiment, it is preferable that the upper limit value of the conditional expression (4) is 0.3.

In the zoom lens ZL according to the present embodiment, it is preferable that at least two lenses of the second lens group G2 satisfy a condition of the following expression (5)

$$vd2 > 70 \quad (5)$$

where vd2 is an Abbe number.

The above conditional expression (5) is for appropriately specifying an Abbe number of a material of the lens disposed in the second lens group G2. By satisfying the conditional expression (5), axial chromatic aberration, particularly axial chromatic aberration in the telephoto end state, can be well corrected. In order to insure the effect of the present embodiment, it is preferable that the lower limit value of the conditional expression (5) is 75. It is even more preferable that the lower limit value of the conditional expression (5) is 80.

In the zoom lens ZL according to the present embodiment, it is preferable that a condition of the following expression (6)

$$0.03 < Dm3/f3 < 0.20 \quad (6)$$

is satisfied, where Dm3 is an absolute value of the moving distance of the third lens group G3 upon zooming from the wide-angle end state to the telephoto end state, and f3 is a focal length of the third lens group G3.

The above conditional expression (6) is for appropriately specifying a relationship of a moving distance Dm3 of the third lens group G3 upon zooming and a focal length f3 of the third lens group G3. By satisfying the conditional expression (6), high variable power ratio and good optical performance can be implemented. If the lower limit value of the conditional expression (6) is not reached, the function of zooming of the third lens G3 decreases, and the moving distance of the second lens group G2 increases to increase the variable power ratio, therefore the size of the lens increases. Correction of astigmatism also becomes difficult. In order to insure the effect of the present embodiment, it is preferable that the lower limit value of the conditional expression (6) is 0.05.

If the upper limit value of the conditional expression (6) is exceeded, on the other hand, the magnification of the third lens group G3 in the telephoto end state increases, and spherical aberration and axial chromatic aberration increase. In order to insure the effect of the present embodiment, it is preferable that the upper limit value of the conditional expression (6) is 0.15.

In the zoom lens ZL according to the present embodiment, it is preferable that at least one surface of the aspherical surfaces of the second lens group G2 has a shape where positive refractive power decreases or negative refractive power increases when approaching from the optical axis to the peripheral area, and a condition of the following expression (7)

$$0.002 < |Sag|/h < 0.05 \quad (7)$$

is satisfied, where Sag is a sag amount that is a distance in the optical axis direction between the aspherical surface and the proxial reference surface at the maximum effective ray height, and h is a maximum effective ray height h on the aspherical surface.

The above conditional expression (7) is for appropriately specifying an aspherical shape of the second lens group G2. By satisfying the conditional expression (7), spherical aberration is corrected and good optical performance can be maintained. If the lower limit value of the conditional expression (7) is not reached, the effect of applying the aspherical surface weakens, which makes the correction of the spherical aberration difficult. If the upper limit value of the conditional expression (7) is exceeded, on the other hand, deterioration of performance due to decentering, particularly the decentering coma aberration in the telephoto end state increases, which makes it impossible to maintain good optical performance.

EXAMPLES

Each example will now be described with reference to the accompanying drawings. The zoom lens ZL (Lens System) according to each example is comprised of a first lens group G1 having negative refractive power, a second lens group G2 having positive refractive power, and a third lens group G3 having positive refractive power, which are disposed in order from an object, as mentioned above. An aperture stop S for adjusting the quantity of light is disposed between the first lens group G1 and the second lens group G2. A filter FL to cut the wavelength in an infrared band is disposed between the third lens group G3 and the image plane I. The image plane I is formed on an unillustrated image sensing device, and the image sensing device is CCD, CMOS or the like.

In the zoom lens ZL having the above mentioned configuration, the first lens group G1 is moved along the optical axis in a convex locus facing the image, the second lens group G2 is moved toward the object, and the third lens group G3 is moved toward the image upon zooming from the wide-angle end state to the telephoto end state, so that the distance between the first lens group G1 and the second lens group G2 decreases, and the distance between the second lens group G2 and the third lens group G3 increases. The aperture stop S is moved along with the second lens group G2 upon zooming from the wide-angle end state to the telephoto end state.

Table 1 to Table 3 shown below are tables on parameters in Example 1 to Example 3. In all tables, f is a focal length, FNo is an F number, ω is a half angel of view, Y is an image height, TL is a total lens length, and Bf is a back focus. The surface number is a sequence of the lens surface from the object along the traveling direction of a ray, r is a radius of curvature of each lens surface, d is a surface distance, which is a distance from each optical surface to the next optical surface (or image plane), nd is a refractive index with respect to the d-line (wavelength: 587.56 nm), and vd is an Abbe number. In the tables, values corresponding to the conditional expressions (1) to (7) are also shown.

In the tables, "mm" is generally used to indicate the unit of focal length f, radius of curvature r, surface distance d and other lengths. For the optical system, however, an equivalent optical performance is obtained even if the optical system is proportionately expanded or proportionally reduced, so the unit is not limited to "mm", but another appropriate unit may be used. In the tables, "0.0000" of the radius of curvature indicates a plane or an aperture, and the refractive index "1.00000" of the air is omitted.

In the tables, an aspherical surface indicated by "561" is given by the following expression (a), where y is the height in a direction perpendicular to the optical axis, S (y) is a distance (Sag amount) along the optical axis from the tangential plane at the vertex of the aspherical surface to a position of the aspherical surface at a height y, r is a radius of curvature of the reference spherical surface (paraxial radius of curvature), K is a conical coefficient, and An is an aspherical coefficient of degree n. In each example, a quadricaspherical coefficient A2 is 0, which is omitted in the tables. En means×10$^n$. For example, 1.234E-05=1.234×10$^{-5}$.

$$S(y)=(y^2/r)/\{1+(1-Ky^2/r^2)^{1/2}\}+A4 \times y^4+A6 \times y^6+A8 \times y^8+A10 \times y^{10} \qquad (a)$$

Example 1

Example 1 will be described with reference to FIG. 2, FIG. 3 and Table 1. FIG. 2 shows the lens configuration and the zooming locus of Example 1. As FIG. 2 shows, in the zoom lens ZL according to this example, a first lens group G1 is comprised of a negative meniscus lens L11 having a concave surface facing the image, a biconcave negative lens L12, and a positive meniscus lens L13 having a convex surface facing the object, which are disposed in order from the object, and the lens surfaces facing the object and the image of the negative meniscus lens L11 are aspherical. A second lens group G2 is comprised of a positive meniscus lens L21 (first positive lens) having a convex surface facing the object, a cemented lens of a positive meniscus lens L22 having a convex surface facing the object and a negative meniscus lens 123 having a concave surface facing the image, and a positive meniscus lens L24 (second positive lens) having a convex surface facing the object, which are disposed in order from the object, and the lens surface facing the object of the positive meniscus lens L22 (first positive lens) and the lens surface facing the image side of the positive meniscus lens L24 (second positive lens) are aspherical. The third lens group G3 is a cemented lens of a biconvex positive lens L31 and a negative meniscus lens L32 having a concave surface facing the object, which are disposed in order from the object.

Table 1 shows each parameter in Example 1. The surface numbers 1 to 19 in Table 1 correspond to the surfaces 1 to 19 in FIG. 2. In Example 1, each lens surface of the first surface, second surface, tenth surface and fourteenth surface are formed to be aspherical.

In the tables, D6, D14 and D17 are variable distances.

TABLE 1

[All parameters]
ZOOM RATIO 3.38

|  | Wide-angle end | intermediate focal length | telephoto end |
|---|---|---|---|
| f | 6.16~ | 12.00~ | 20.80 |
| Fno | 2.84~ | 4.09~ | 5.74 |
| ω | 39.6~ | 22.5~ | 13.3 |
| TL | 48.6397~ | 45.9036~ | 50.8798 |
| Bf | 0.6073~ | 0.6073~ | 0.6073 |

[Lens parameters]

| Surface Number | r | m | nd | vd |
|---|---|---|---|---|
| 1* | 37.0000 | 1.5000 | 1.801387 | 45.45 |
| 2* | 7.5441 | 4.0000 | | |
| 3 | −95.0000 | 0.9000 | 1.696797 | 55.53 |
| 4 | 32.6595 | 0.4000 | | |
| 5 | 13.9429 | 2.0000 | 1.846660 | 23.78 |
| 6 | 38.7053 | (D6 = variable) | | |
| 7 | 0.0000 | 0.5000 | (aperture stop S) | |
| 8 | 10.0634 | 1.6000 | 1.497820 | 82.52 |
| 9 | 95.1450 | 0.1000 | | |
| 10* | 5.5409 | 1.9000 | 1.693501 | 53.20 |
| 11 | 25.4831 | 0.8000 | 1.688931 | 31.07 |
| 12 | 4.3733 | 1.0000 | | |
| 13 | 12.5983 | 1.5000 | 1.497820 | 82.56 |
| 14* | 36.4194 | (D14 = variable) | | |
| 15 | 50.1262 | 2.2000 | 1.603001 | 65.44 |
| 16 | −13.7660 | 0.8000 | 1.846660 | 23.78 |
| 17 | −19.3825 | (D17 = variaable) | | |
| 18 | 0.0000 | 1.5000 | 1.516330 | 64.14 |
| 19 | 0.0000 | (Bf) | | |

[Aspherical data]

First surface

K = 2.0000, A4 = 8.96550E−05, A6 = 0.00000E+00,
A8 = 0.00000E+00, A10 = 0.00000E+00
Second surface K = 0.9785, A4 = 6.37850E−05, A6 = −5.51410E−07,
A8 = 4.89070E−08, A10 = −4.56120E−10
Tenth surface K = 0.9126, A4 = 4.19240E−07, A6 = 0.00000E+00,
A8 = 0.00000E+00, A10 = 0.00000E+00
Fourteenth surface K = 1.0000, A4 = 6.50240E−04, A6 = 1.71580E−05,
A8 = 0.00000E+00, A10 = 0.00000E+00

TABLE 1-continued

[All parameters]
ZOOM RATIO 3.38

[Zooming data]

| Variable Distance | Wide-angle end | intermediate focal length | telephoto end |
|---|---|---|---|
| f   | 6.16    | 12.00   | 20.80   |
| D6  | 18.1424 | 7.6544  | 2.0324  |
| D14 | 3.5153  | 12.9610 | 23.5883 |
| D17 | 5.6745  | 3.9807  | 3.9517  |

[Zoom lens group data]

| Group No. | First surface of group | Focal length of group |
|---|---|---|
| G1 | 1  | −14.83797 |
| G2 | 8  | 13.88202  |
| G3 | 15 | 26.53638  |

[Conditional expressions]
(1) νd = 82.56 (positive meniscus lens L24)
(2) νdL = 82.56 (positive meniscus lens L24)
(3) f2/f2L = 0.37
(4) f2/f2c = −0.015
(5) νd2 = 82.52 (positive meniscus lens L21) νd2 = 82.56 (positive meniscus lens L24)
(6) Dm3/f3 = 0.065
(7) |Sag|/h = 0.0030 (Tenth surface) |Sag|/h = 0.0118 (Fourteenth surface)

As the parameters in Table 1 shows, the zoom lens ZL according to the present example satisfies all the conditional expressions (1) to (7).

Figure 3A:
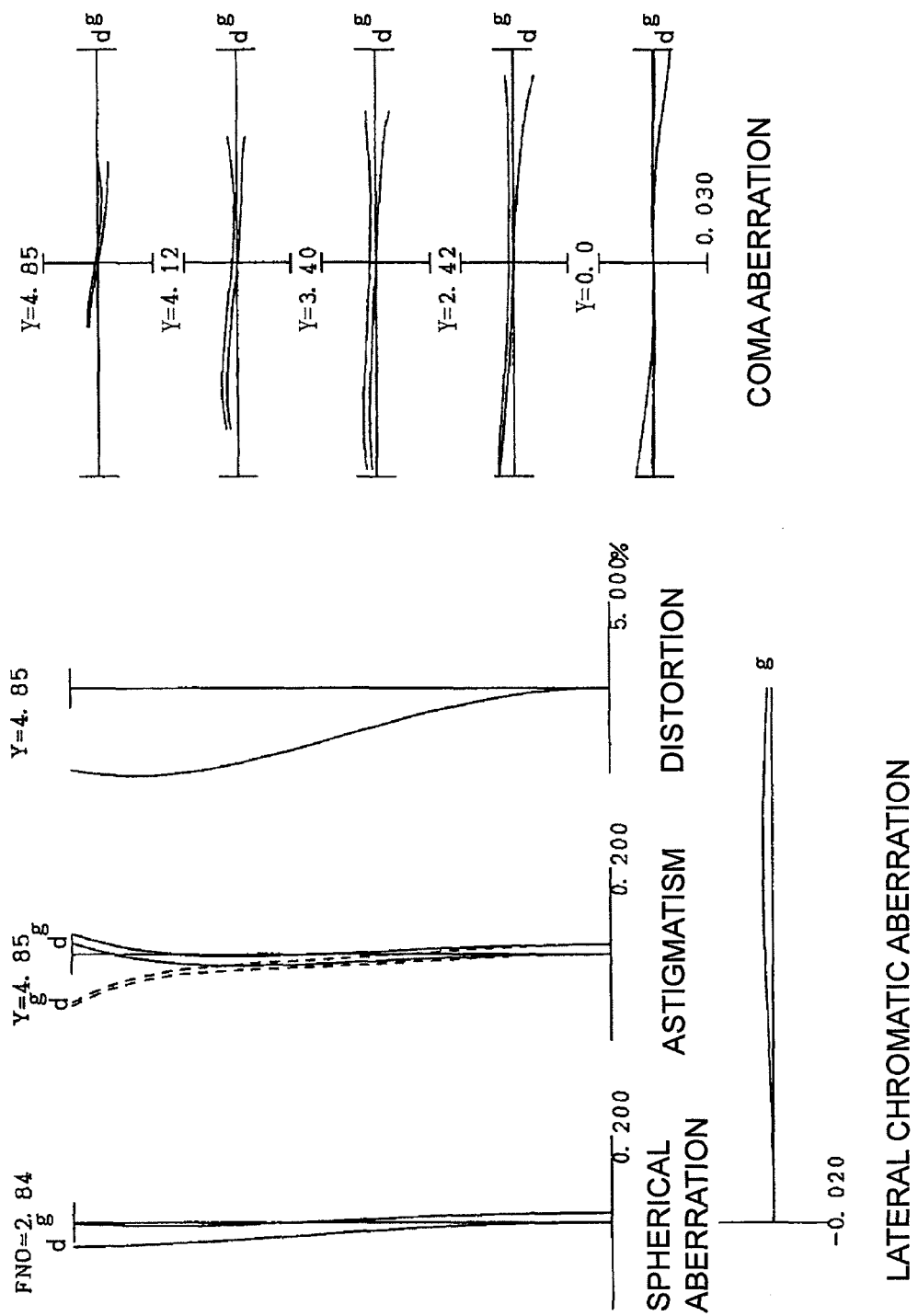
FIG. 3A are graphs showing various aberrations of the zoom lens according to Example 1 upon focusing on infinity in the wide-angle end state, FIG. 3B are graphs showing various aberrations of the zoom lens according to Example 1 upon focusing on infinity in the intermediate focal length state, and FIG. 3C are graphs showing various aberrations of the zoom lens according to Example 1 upon focusing on infinity in the telephoto end state.
Figure 3B:
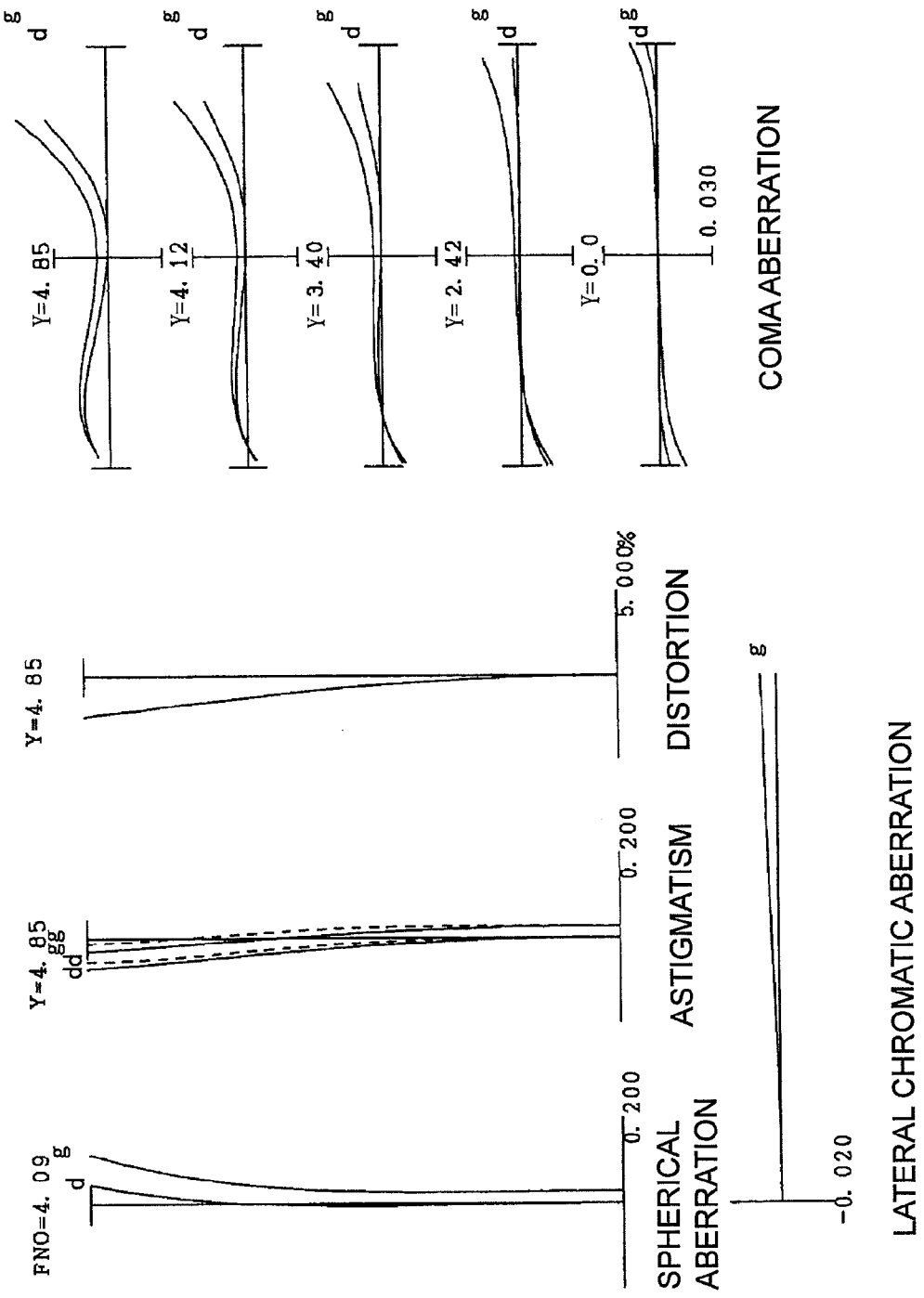
Figure 3C:
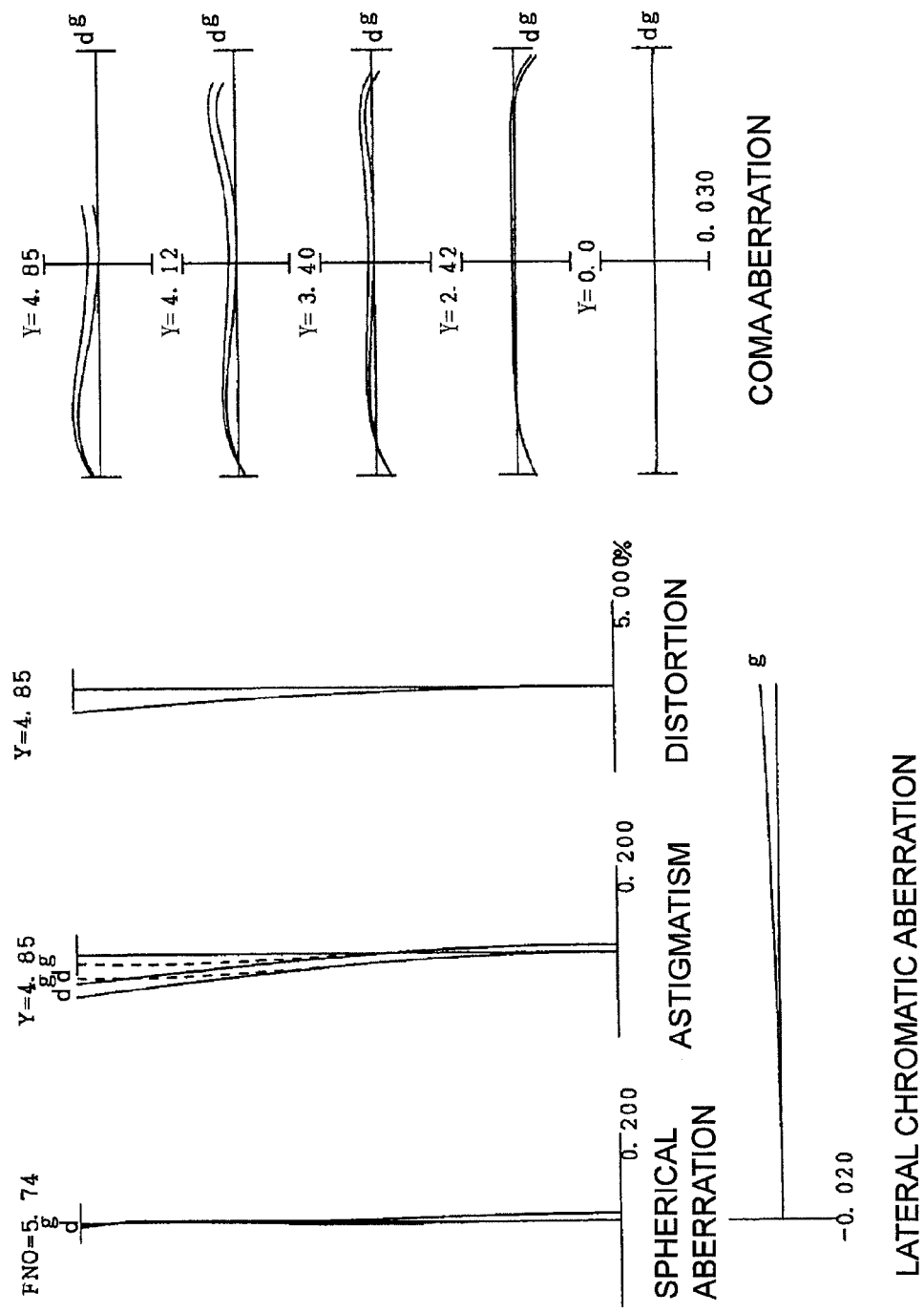

FIG. 3 are graphs showing various aberrations of Example 1. In other words, FIG. 3A are graphs showing various aberrations of the zoom lens upon focusing on infinity in the wide-angle end state (f=6.18 mm), FIG. 3B are graphs showing various aberrations of the zoom lens upon focusing on infinity in the intermediate focal length state (f=12.0 mm), and FIG. 3C are graphs shown various aberrations of the zoom lens upon focusing on infinity in the telephoto end state (f=23.3 mm).

In each group showing aberrations, FNo indicates an F number, and Y indicates an image height. In the graph showing spherical aberration, a value of an F number corresponding to the maximum aperture is shown, in the graphs showing astigmatism and distortion, a maximum value of the image height is shown respectively, and in the graph showing coma aberration, a value of each image height is shown. d shows various aberrations with respect to the d-line (wavelength: 587.6 nm), g shows various aberrations with respect to the g-line (wavelength: 435.8 nm), and aberrations with no indication show aberrations with respect to the d-line. In the graph showing astigmatism, the solid line indicates a sagittal image surface, and a broken line indicates a meridional image surface. The graph showing coma aberration is based on a half angle of view. The above description on the graphs showing aberrations is the same for other examples, where this description will be omitted.

As each graph showing aberrations clarifies, in Example 1, various aberrations in each focal length state from the wide-angle end state to the telephoto end state are well corrected, and an excellent image forming performance is implemented.

As a result, by equipping the zoom lens ZL in Example 1, excellent optical performance can be insured for the electronic still camera 1 (optical apparatus, see FIG. 1).

Example 2

Example 2 will be described with reference to FIG. 4, FIG. 5 and Table 2. FIG. 4 shows the lens configuration and the zooming locus of Example 2. As FIG. 4 shows, in the zoom lens ZL according to this example, a first lens group G1 is comprised of a negative meniscus lens L11 having a concave surface facing the image, a biconcave negative lens L12, and a positive meniscus lens L13 having a convex surface facing the object, which are disposed in order from the object, and the lens surfaces facing the object and the image of the negative meniscus lens L11 are aspherical. A second lens group G2 is comprised of a positive meniscus lens L21 (first positive lens) having a convex surface facing the object, a cemented lens of a positive meniscus lens L22 having a convex surface facing the object and a negative meniscus lens L23 having a concave surface facing the image, and a positive meniscus lens L24 (second positive lens) having a convex surface facing the object, which are disposed in order from the object, and the lens surface facing the object of the positive meniscus lens L22 (first positive lens) and the lens surface facing the image side of the positive meniscus lens L24 (second positive lens) are aspherical. The third lens group G3 is a cemented lens of a biconvex positive lens L31 and a negative meniscus lens L32 having a concave surface facing the object, which are disposed in order from the object.

Table 2 shows each parameter in Example 2. The surface numbers 1 to 19 in Table 2 correspond to the surfaces 1 to 19 in FIG. 4. In Example 2, each lens surface of the first surface, second surface, tenth surface and thirteenth surface are formed to be aspherical.

In the tables, D6, D14 and D17 are variable distances.

TABLE 2

[All parameters]
ZOOM RATIO 3.77

|   | Wide-angle end | intermediate focal length | telephoto end |
|---|---|---|---|
| f   | 6.18~    | 12.00~   | 23.30   |
| Fno | 2.79~    | 3.98~    | 6.13    |
| ω   | 39.3~    | 22.4~    | 11.8    |
| TL  | 53.0009~ | 49.2217~ | 55.5525 |
| Bf  | 1.1000~  | 1.1000~  | 1.1000  |

[Lens parameters]

| Surface Number | r | m | nd | νd |
|---|---|---|---|---|
| 1*  | 38.0000   | 1.8000  | 1.806100 | 40.77 |
| 2*  | 8.1016    | 4.9000  |          |       |
| 3   | −100.1370 | 0.9000  | 1.729160 | 54.66 |
| 4   | 28.0041   | 0.2000  |          |       |
| 5   | 15.2655   | 2.2000  | 1.808095 | 22.76 |
| 6   | 69.4671   | (D6 = variable) | | |
| 7   | 0.0000    | 0.5000  | (aperture stop S) | |
| 8   | 9.7056    | 1.7000  | 1.497820 | 82.52 |
| 9   | 170.1195  | 0.2000  |          |       |
| 10* | 5.9598    | 2.1000  | 1.693500 | 53.22 |
| 11  | 36.2560   | 0.7000  | 1.688930 | 31.16 |
| 12  | 4.5687    | 1.2000  |          |       |
| 13* | 23.7051   | 1.5000  | 1.495890 | 82.24 |
| 14  | 369.7372  | (D14 = variable) | | |
| 15  | 30.2543   | 2.4000  | 1.603000 | 65.47 |
| 16  | −17.5786  | 0.8000  | 1.805180 | 25.43 |
| 17  | −28.2877  | (D17 = variable) | | |

TABLE 2-continued

[All parameters]
ZOOM RATIO 3.77

| 18 | 0.0000 | 1.0000 | 1.516330 | 64.14 |
| 19 | 0.0000 | (Bf) | | |

[Aspherical data]

First surface

K = 2.0000, A4 = 9.00000E−05, A6 = −1.00000E−07,
A8 = 0.00000E+00, A10 = 0.00000E+00
Second surface K = 0.9096, A4 = 7.28780E−05, A6 = 1.45180E−06,
A8 = 0.00000E+00, A10 = 1.79160E−10
Tenth surface K = 1.0000, A4 = −4.79690E−05, A6 = 0.00000E+00,
A8 = −7.46680E−08, A10 = 0.00000E+00
Thirteenth surface K = 1.0000, A4 = −5.01120E−04, A6 = −1.49330E−05,
A8 = 0.00000E+00, A10 = 0.00000E+00

[Zooming data]

| Variable Distance | Wide-angle end | intermediate focal length | telephoto end |
|---|---|---|---|
| f | 6.18 | 12.00 | 23.30 |
| D6 | 20.5184 | 8.8276 | 2.1085 |
| D14 | 4.0172 | 13.6062 | 27.9646 |
| D17 | 5.2351 | 3.5878 | 2.2742 |

[Zoom lens group data]

| Group No. | First surface of group | Focal length of group |
|---|---|---|
| G1 | 1 | −15.53772 |
| G2 | 8 | 14.82228 |
| G3 | 15 | 27.56588 |

[Conditional expressions]
(1) vd = 82.24 (positive meniscus lens L24)
(2) vdL = 82.24 (positive meniscus lens L24)
(3) f2/f2L = 0.29
(4) f2/f2c = −0.082
(5) vd2 = 82.52 (positive meniscus lens L21) vd2 = 82.56 (positive meniscus lens L24)
(6) Dm3/f3 = 0.11
(7) |Sag|/h = 0.0018 (Tenth surface) |Sag|/h = 0.0093 (Thirteenth surface)

As the parameters in Table 2 shows, the zoom lens ZL according to the present example satisfies all the conditional expressions (1) to (7).

Figure 5A:
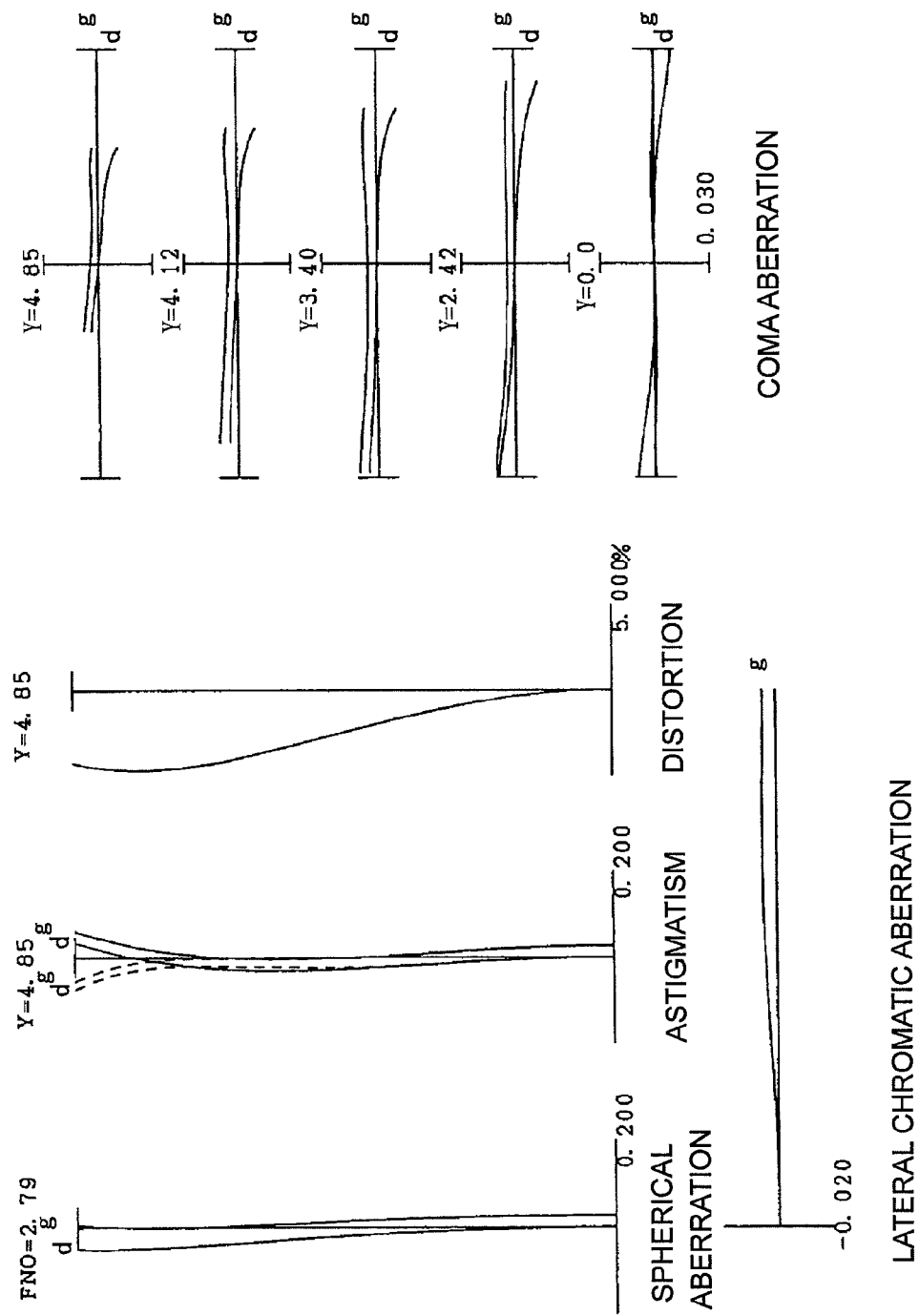
FIG. 5A are graphs showing various aberrations of the zoom lens according to Example 2 upon focusing on infinity in the wide-angle end state, FIG. 5B are graphs showing various aberrations of the zoom lens according to Example 2 upon focusing on infinity in the intermediate focal length state, and FIG. 5C are graphs showing various aberrations of the zoom lens according to Example 2 upon focusing on infinity in the telephoto end state.
Figure 5B:
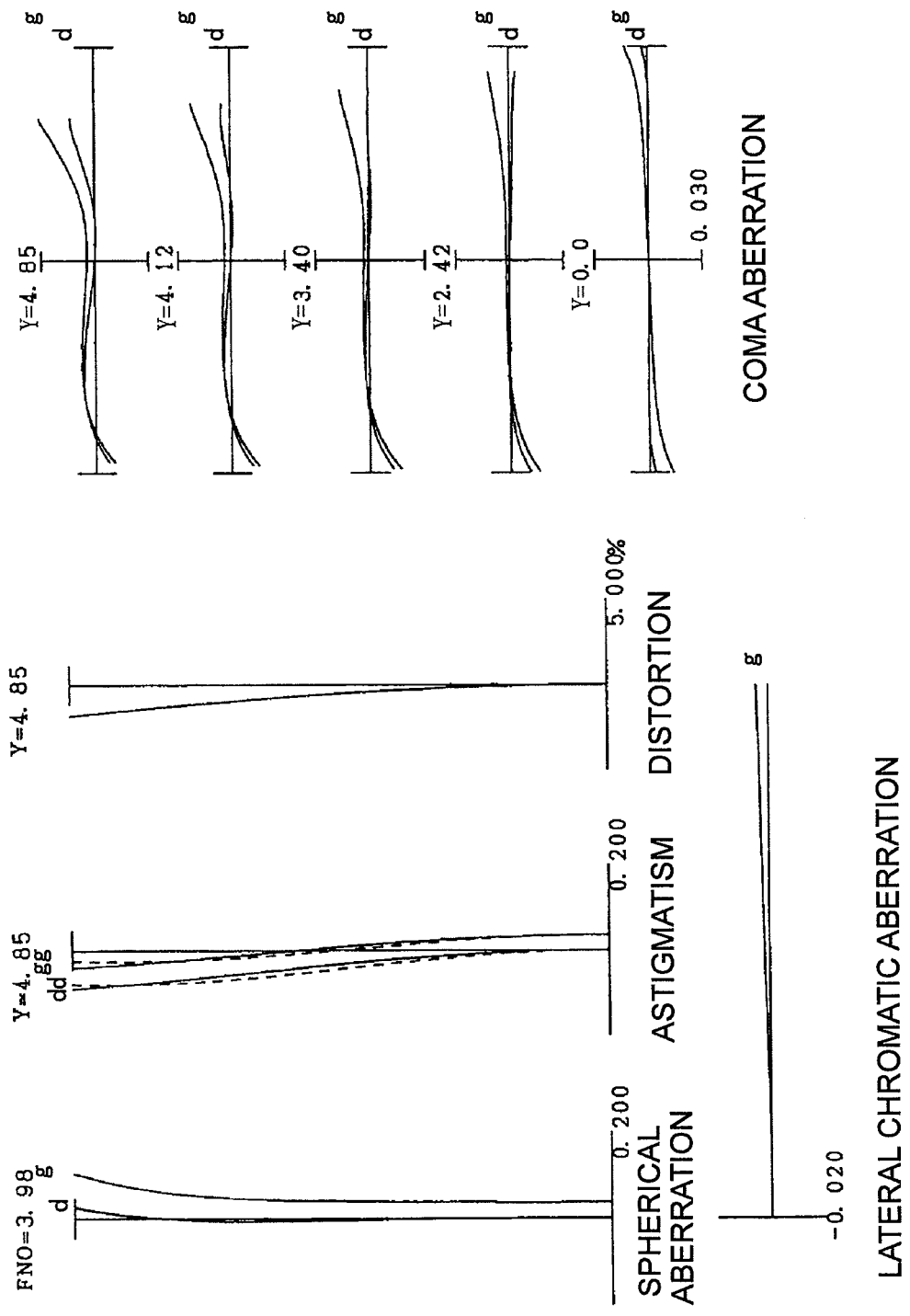
Figure 5C:
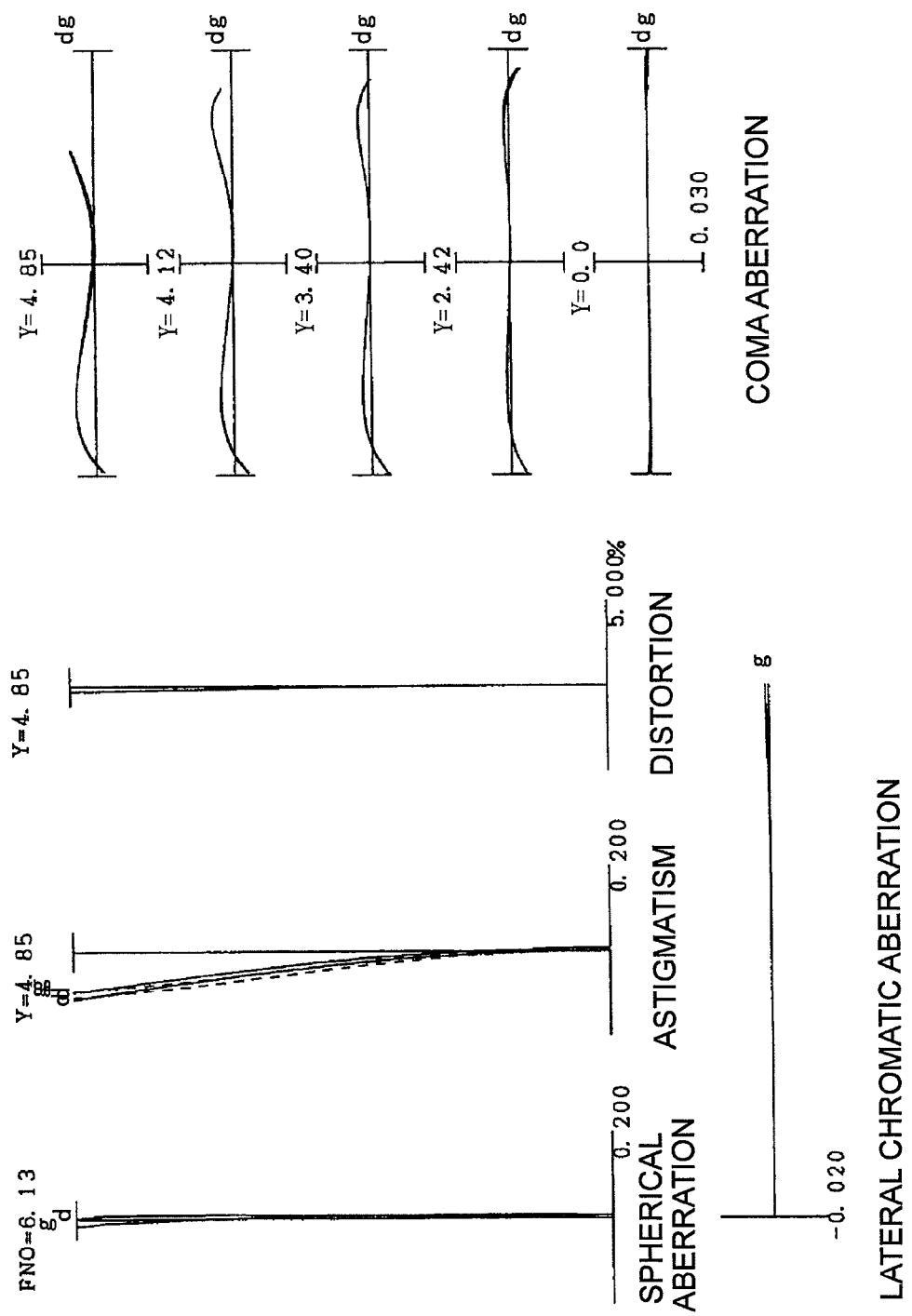

FIG. 5 are graphs showing various aberrations of Example 2. In other words, FIG. 5A are graphs showing various aberrations of the zoom lens upon focusing on infinity in the wide-angle end state (f=6.18 mm), FIG. 5B are graphs showing various aberrations of the zoom lens upon focusing on infinity in the intermediate focal length state (f=12.0 mm), and FIG. 5C are graphs shown various aberrations of the zoom lens upon focusing on infinity in the telephoto end state (f=23.3 mm).

As each graph showing aberrations clarifies, in Example 2, various aberrations in each focal length state from the wide-angle end state to the telephoto end state are well corrected, and an excellent image forming performance is implemented.

As a result, by equipping the zoom lens ZL in Example 2, excellent optical performance can be insured for the electronic still camera 1 (optical apparatus, see FIG. 1).

Example 3

Example 3 will be described with reference to FIG. 6, FIG. 7 and Table 3. FIG. 6 shows the lens configuration and the zooming locus of Example 3. As FIG. 6 shows, in the zoom lens ZL according to this example, a first lens group G1 is comprised of a negative meniscus lens L11 having a concave surface facing the image, a biconcave negative lens L12, and a positive meniscus lens L13 having a convex surface facing the object, which are disposed in order from the object, and the lens surfaces facing the object and the image of the negative meniscus lens L11 are aspherical. A second lens group G2 is comprised of a positive meniscus lens L21 (first positive lens) having a convex surface facing the object, a cemented lens of a biconvex positive lens L22 having a convex surface facing the object and a biconcave negative lens L23 having a concave surface facing the image, and a biconvex positive lens L24 (second positive lens) having a convex surface facing the object, which are disposed in order from the object, and the lens surface facing the object of the biconvex positive lens L22 (first positive lens) and the lens surface facing the image side of the biconcave positive lens L24 (second positive lens) are aspherical. The third lens group G3 is a cemented lens of a biconvex positive lens L31 and a negative meniscus lens L32 having a concave surface facing the object, which are disposed in order from the object.

Table 3 shows each parameter in Example 3. The surface numbers 1 to 19 in Table 3 correspond to the surfaces 1 to 19 in FIG. 6. In Example 3, each lens surface of the first surface, second surface, tenth surface and thirteenth surface are formed to be aspherical.

In the tables, D6, D14 and D17 are variable distances.

TABLE 3

[All parameters]
ZOOM RATIO 3.79

| | Wide-angle end | intermediate focal length | telephoto end |
|---|---|---|---|
| f | 6.18~ | 12.00~ | 23.40 |
| Fno | 2.79~ | 3.96~ | 6.15 |
| ω | 39.4~ | 22.4~ | 11.7 |
| TL | 52.9526~ | 49.0044~ | 55.5880 |
| Bf | 1.0206~ | 1.0206~ | 1.0206 |

[Lens parameters]

| Surface Number | r | m | nd | vd |
|---|---|---|---|---|
| 1* | 38.0000 | 1.8000 | 1.801390 | 45.46 |
| 2* | 8.1016 | 4.9000 | | |
| 3 | −55.0000 | 0.9000 | 1.487490 | 70.23 |
| 4 | 24.0000 | 0.2000 | | |
| 5 | 14.6772 | 2.2000 | 1.805181 | 25.42 |
| 6 | 46.6559 | (D6 = variable) | | |
| 7 | 0.0000 | 0.5000 | (aperture stop S) | |
| 8 | 8.3342 | 1.7000 | 1.495890 | 82.24 |
| 9 | 57736.0070 | 0.2000 | | |
| 10* | 6.8919 | 2.1000 | 1.729157 | 54.68 |
| 11 | −487.8480 | 0.7000 | 1.720467 | 34.71 |
| 12 | 4.7673 | 1.2000 | | |
| 13 | 37.9795 | 1.5000 | 1.495890 | 82.24 |
| 14* | −77.3306 | (D14 = variable) | | |
| 15 | 29.3951 | 2.4000 | 1.603001 | 65.44 |
| 16 | −16.3010 | 0.8000 | 1.805181 | 25.42 |
| 17 | −27.9696 | (D17 = variable) | | |

TABLE 3-continued

[All parameters]
ZOOM RATIO 3.79

| 18 | 0.0000 | 1.0000 | 1.516330 | 64.14 |
|----|--------|--------|----------|-------|
| 19 | 0.0000 | (Bf)   |          |       |

[Aspherical data]

First surface

K = 2.0000, A4 = 9.00000E−05, A6 = −1.00000E−07,
A8 = 0.00000E+00, A10 = 0.00000E+00

Second surface

K = 0.8220, A4 = 8.25010E−05, A6 = 2.32760E−06,
A8 = −2.20900E−08, A10 = 5.77780E−10

Tenth surface

K = 1.0000, A4 = −9.92080E−05, A6 = −1.42070E−06,
A8 = 0.00000E+00, A10 = 0.00000E+00

Thirteenth surface

K = 1.0000, A4 = −3.69760E−04, A6 = −5.93240E−06,
A8 = 0.00000E+00, A10 = 0.00000E+00

[Zooming data]

| Variable Distance | Wide-angle end | intermediate focal length | telephoto end |
|---|---|---|---|
| f   | 6.18    | 12.00   | 23.40   |
| D6  | 20.5147 | 8.6521  | 2.0733  |
| D14 | 3.9931  | 13.3361 | 28.0589 |
| D17 | 5.3241  | 3.8954  | 2.3351  |

[Zoom lens group data]

| Group No. | First surface of group | Focal length of group |
|---|---|---|
| G1 | 1  | −15.53808 |
| G2 | 9  | 14.82233  |
| G3 | 15 | 27.55811  |

[Conditional expressions]
(1) vd = 82.24 (positive meniscus lens L24)
(2) vdL = 82.24 (positive meniscus lens L24)
(3) f2/f2L = 0.29
(4) f2/f2c = −0.287
(5) vd2 = 82.24(positive meniscus lens L21) vd2 = 82.24(positive meniscus lens L24)
(6) Dm3/f3 = 0.11
(7) |Sag|/h = 0.0041 (Tenth surface) |Sag|/h = 0.0064 (Thirteenth surface)

As the parameters in Table 3 shows, the zoom lens ZL according to the present example satisfies all the conditional expressions (1) to (7).

Figure 7B:
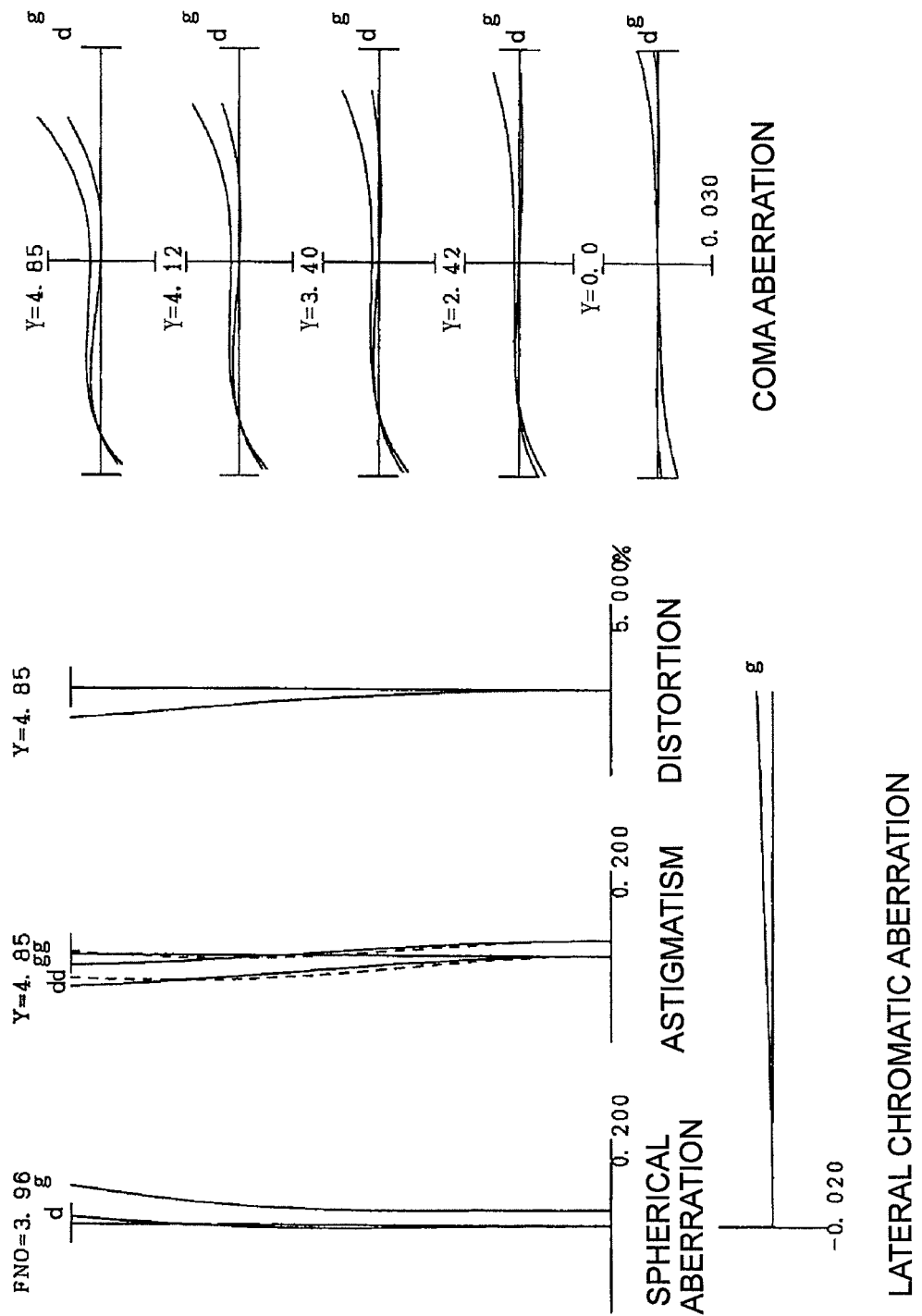
FIG. 7A are graphs showing various aberrations of the zoom lens according to Example 3 upon focusing on infinity in the wide-angle end state, FIG. 7B are graphs showing various aberrations of the zoom lens according to Example 3 upon focusing on infinity in the intermediate focal length state, and FIG. 7C are graphs showing various aberrations of the zoom lens according to Example 3 upon focusing on infinity in the telephoto end state.
Figure 7C:
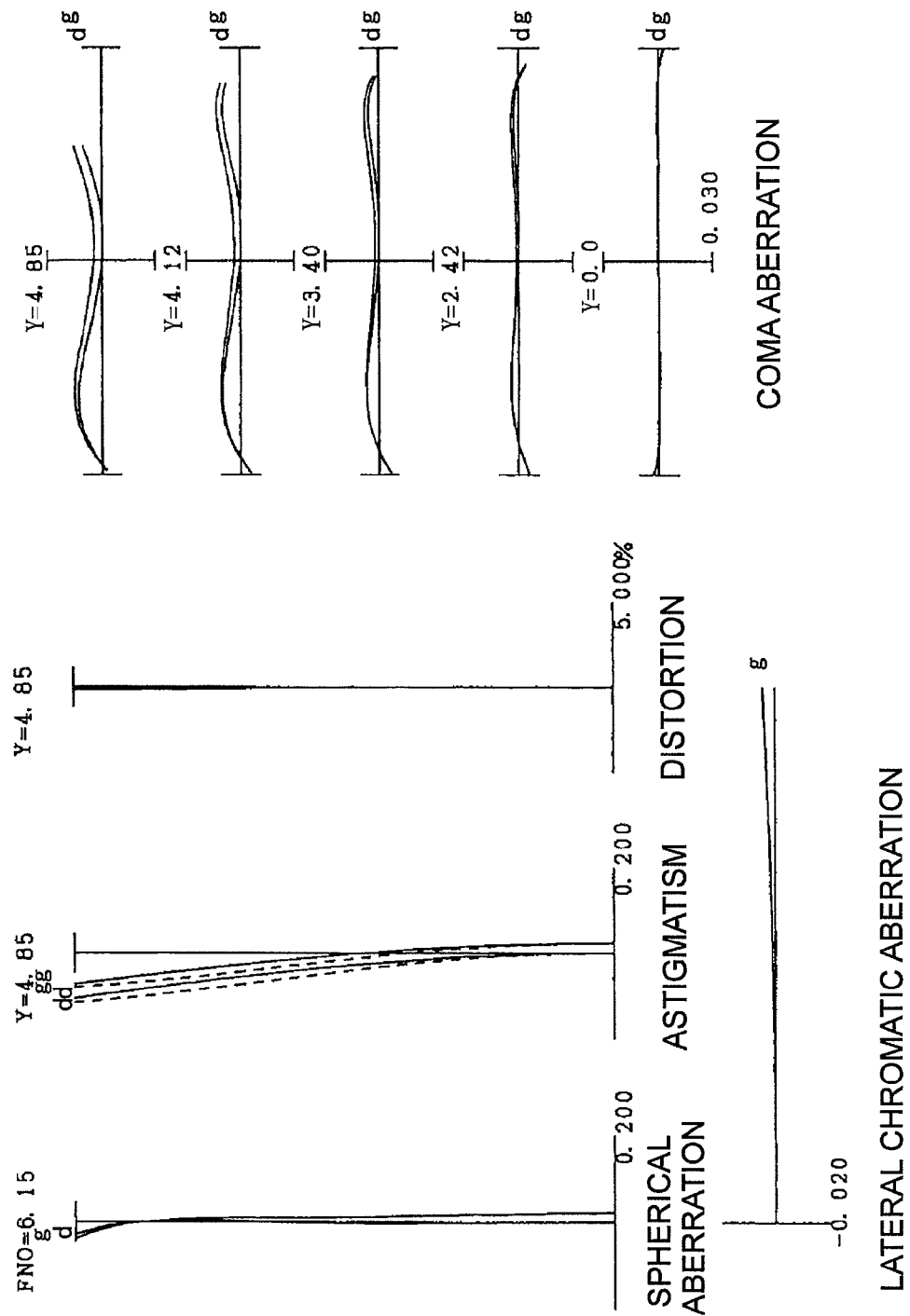

FIG. 7 are graphs showing various aberrations of Example 3. In other words, FIG. 7A are graphs showing various aberrations of the zoom lens upon focusing on infinity in the wide-angle end state (f=6.18 mm), FIG. 7B are graphs showing various aberrations of the zoom lens upon focusing on infinity in the intermediate focal length state (f=12.0 mm), and FIG. 7C are graphs shown various aberrations of the zoom lens upon focusing on infinity in the telephoto end state (f=23.3 mm).

As each graph showing aberrations clarifies, in Example 3, various aberrations in each focal length state from the wide-angle end state to the telephoto end state are well corrected, and an excellent image forming performance is implemented.

As a result, by equipping the zoom lens ZL in Example 3, excellent optical performance can be insured for the electronic still camera 1 (optical apparatus, see FIG. 1).

Figure 8:
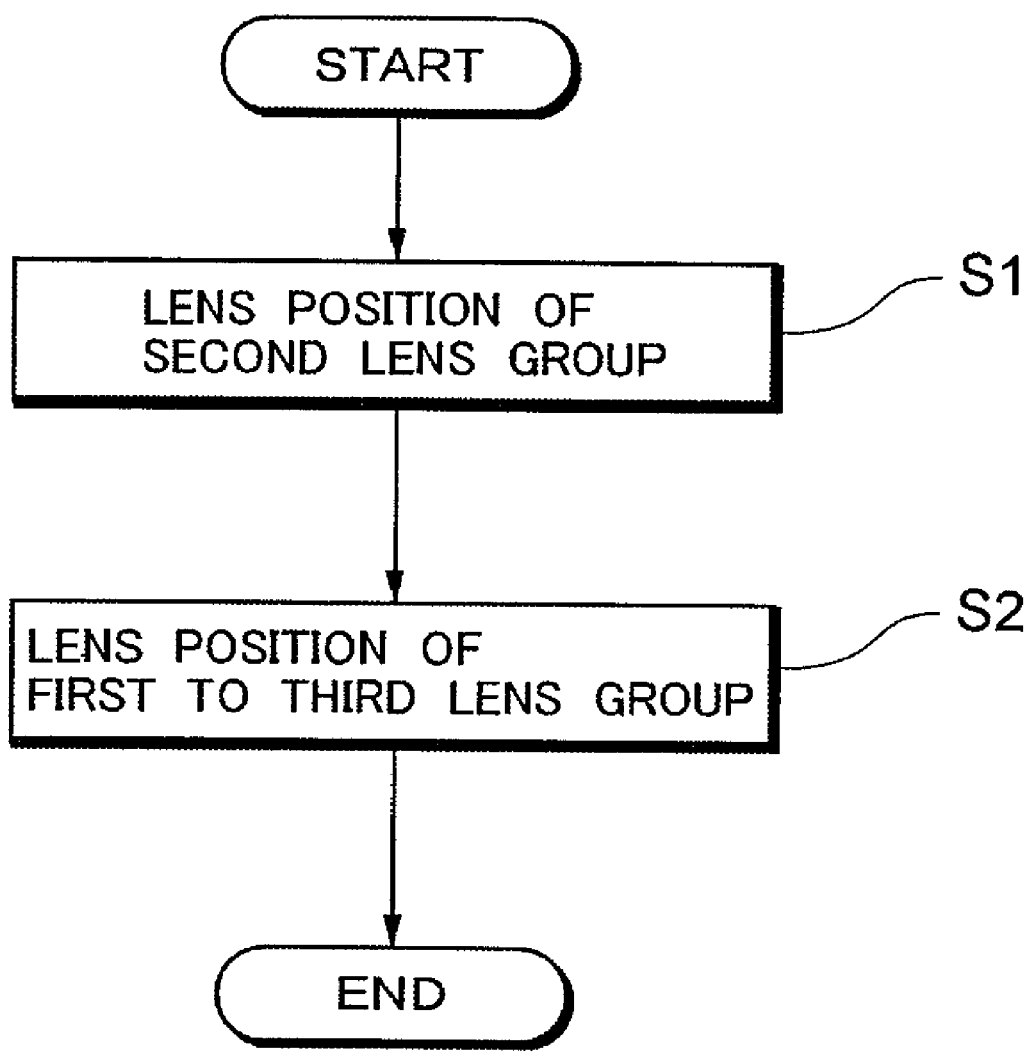
FIG. 8 is a flow chart depicting a manufacturing method for the zoom lens.

A manufacturing method for a zoom lens, which has a first lens group having negative refractive power, a second lens group having positive refractive power, and a third lens group having positive refractive power, which are disposed in order from the object, will now be described with reference to FIG. 8.

First at least two positive lenses having an aspherical surface respectively, including at least one positive lens which satisfies a condition of the expression vd>70, where vd is an Abbe number, and has an aspherical surface, as the second lens group, are disposed in a cylindrical lens barrel (step S1). Then the first to third lens groups are disposed so that the distance between the first lens group and the second lens group and the distance between the second lens group and the third lens group can be changed (step S2).

It is preferable that the manufacturing method further has a step of disposing one positive lens out of at least two positive lenses having an aspherical surface which are disposed as the second lens group, is disposed closest to the image in the second lens group. The lens disposed closest to the image in the second lens group satisfies a condition of the expression vdL>70, where vdL is an Abbe number. Also the zoom lens satisfies a condition of the expression 0.1<f2/f2L<0.6, where f2 is a focal length of the second lens group, and f2L is a focal length of the lens disposed closest to the image in the image in the second lens group.

In the above embodiments, the following content can be used if appropriate, within a range where the optical performance is not diminished.

In the above examples, the zoom lens ZL comprised of three groups was shown, but the present invention can also be applied to other configurations, such as a four-group or five-group configuration.

A single lens group, or a plurality of lens groups, or a partial lens group, may be a focusing lens group which focuses on an object from infinity to a short range by moving in an optical axis direction. The focusing lens group can also be applied to auto focus, and is also appropriate for a driving motor for auto focus (e.g. ultrasonic motor). It is preferable that the first lens group G1 or the third lens group G3, particularly the third lens group G3, is the focus lens group.

A lens group or a partial lens group may be a vibration proof lens group which is vibrated in a direction perpendicular to the optical axis, so as to correct image blur generated by hand motion. It is particularly preferable that all or part of the second lens group G2 is a vibration proof lens group.

Each lens surface may be aspherical. An aspherical surface formed by grinding, a glass mold aspherical surface in which glass is formed to be an aspherical shape using a die, and a composite aspherical surface where resin is formed to be an aspherical shape on the surface of glass, are all acceptable.

The aperture stop S is preferably disposed between the first lens group G1 and the second lens group G2, but a lens frame may play the role of an aperture stop S, without disposing a separate element of an aperture stop S.

An anti-reflection film having high transmittance in a wide wavelength area may be formed on each lens surface to decrease flares and ghosts, so that a high optical performance with high contrast may be implemented.

In order to make the present invention clear, the present invention was described using the configuration requirements of the embodiment, but needless to say, the present invention is not limited to this.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens, comprising, in order from an object:
   a first lens group having negative refractive power, a second lens group having positive refractive power, and a third lens group having positive refractive power,
   a distance between the first lens group and the second lens group, and a distance between the second lens group and the third lens group being changed upon zooming,
   the second lens group having at least two positive lenses having an aspherical surface respectively, and
   at least one of the positive lenses having the aspherical surface satisfying the following conditional expression, vd>70 where vd is an Abbe number; and
   wherein the following conditional expression is satisfied:

0.1<f2/f2L<0.6 where f2 is a focal length of the second lens group and f2L is a focal length of a lens disposed closest to the image of the second lens group.

2. The zoom lens according to claim 1, wherein at least one positive lens out of at least the two positive lenses having the aspherical surface is a lens disposed closest to an image in the second lens group.

3. The zoom lens according to claim 1, wherein the lens disposed closest to an image in the second lens group satisfies the following conditional expression:

vdL>70 where vdL is an Abbe number.

4. The zoom lens according to claim 1, wherein the second lens group further comprises a first positive lens, a cemented lens and a second positive lens, which are disposed in order from the object.

5. The zoom lens according to claim 1, wherein
   the second lens group further comprises a cemented lens, and
   the following conditional expression is satisfied:

−0.5<f2/f2c<0.5 where f2 is a focal length of the second lens group and f2c is a focal length of the cemented lens of the second lens group.

6. The zoom lens according to claim 1, wherein at least the two lenses of the second lens group satisfy the following conditional expression:

vd2>70 where vd2 is an Abbe number.

7. The zoom lens according to claim 1, wherein the third lens group is moved toward an image side, upon zooming from a wide-angle end state to a telephoto end state.

8. The zoom lens according to claim 1, wherein the following conditional expression is satisfied:

0.03<Dm3/f3<0.20 where Dm3 is a moving distance of the third lens group upon zooming from a wide-angle end state to a telephoto end state and f3 is a focal length of the third lens group.

9. The zoom lens according to claim 1, wherein the third lens group is formed of a cemented lens comprising a positive lens and a negative lens.

10. The zoom lens according to claim 1, wherein the third lens group is a focusing lens group.

11. The zoom lens according to claim 1, wherein an aperture stop is disposed between the first lens group and the second lens group.

12. The zoom lens according to claim 1, wherein
    at least one surface of the aspherical surfaces of the second lens group has a shape with which a positive refractive power decreases or a negative refractive power increases in a direction from an optical axis to a peripheral area, and
    the following conditional expression is satisfied:

0.002<|Sag|/h<0.05 where Sag is a sag amount, which is a distance between the aspherical surface and a paraxial reference spherical surface in an optical axis direction at a maximum effective ray height and h is a maximum effective ray height on the aspherical surface.

13. The zoom lens according to claim 1, wherein the first lens group further comprises a first negative lens, a second negative lens and a positive lens, which are disposed in order from the object side.

14. The zoom lens according to claim 1, wherein any one lens surface of lenses constituting the first lens group is aspherical.

15. An optical apparatus comprising the zoom lens according to claim 1.

16. A manufacturing method for a zoom lens having, in order from an object, a first lens group having negative refractive power, a second lens group having positive refractive power, and a third lens group having positive refractive power,
    the method comprising the steps of:
    disposing as the second lens group at least two positive lenses having an aspherical surface respectively, including at least one positive lens having an aspherical surface which satisfies the conditional expression vd>70 where vd is an Abbe number; and
    disposing the first to the third lens groups so that the distance between the first lens group and the second lens group, and the distance between the second lens group and the third lens group can be changed; and
    wherein the following conditional expression is satisfied:

0.1<f2/f2L<0.6 where f2 is a focal length of the second lens group, and f2L is a focal length of a lens disposed closest to the image in the second lens group.

17. The manufacturing method for the zoom lens according to claim 16, further comprising a step of disposing one positive lens out of at least the two positive lenses having the aspherical surface disposed as the second lens group, so as to be closest to the image in the second lens group.

18. The manufacturing method for the zoom lens according to claim 17, wherein the lens closest to the image in the second lens group satisfies the conditional expression vdL>70, where vdL is an Abbe number.

19. A zoom lens, comprising, in order from an object:
    a first lens group having negative refractive power, second lens group having positive refractive power, and a third lens group having positive refractive power,
    a distance between the first lens group and the second lens group, and a distance between the second lens group and the third lens group being changed upon zooming,
    the second lens group having at least two positive lenses having an aspherical surface respectively, and at least one of the positive lenses having the aspherical surface satisfying the following conditional expression, $vd>70$ where vd is an Abbe number; and wherein
the second lens group further comprises a cemented lens, and
the following conditional expression is satisfied:

$-0.5<f2/f2c<0.5$ where f2 is a focal length of the second lens group and f2c is a focal length of the cemented lens of the second lens group.

20. A zoom lens, comprising, in order from an object:
a first lens group having negative refractive power, a second lens group having positive refractive power, and a third lens group having positive refractive power,
a distance between the first lens group and the second lens group, and a distance between the second lens group and the third lens group being changed upon zooming,
the second lens group having at least two positive lenses having an aspherical surface respectively, and
at least one of the positive lenses having the aspherical surface satisfying the following conditional expression, $vd>70$ where vd is an Abbe number; and wherein the following conditional expression is satisfied:

$0.03<Dm3/f3<0.20$ where Dm3 is a moving distance of the third lens group upon zooming from a wide-angle end state to a telephoto end state and f3 is a focal length of the third lens group.

21. A zoom lens, comprising, in order from an object:
a first lens group having negative refractive power, a second lens group having positive refractive power, and a third lens group having positive refractive power,
a distance between the first lens group and the second lens group, and a distance between the second lens group and the third lens group being changed upon zooming,
the second lens group having at least two positive lenses having an aspherical surface respectively, and
at least one of the positive lenses having the aspherical surface satisfying the following conditional expression, $vd>70$ where vd is an Abbe number; and wherein
the third lens group is formed of a cemented lens comprising a positive lens and a negative lens.

22. A zoom lens, comprising, in order from an object:
a first lens group having negative refractive power, a second lens group having positive refractive power, and a third lens group having positive refractive power,
a distance between the first lens group and the second lens group, and a distance between the second lens group and the third lens group being changed upon zooming,
the second lens group having at least two positive lenses having an aspherical surface respectively, and
at least one of the positive lenses having the aspherical surface satisfying the following conditional expression, $vd>70$ where vd is an Abbe number; and wherein
at least one surface of the aspherical surfaces of the second lens group has a shape with which a positive refractive power decreases or a negative refractive power increases in a direction from an optical axis to a peripheral area, and
the following conditional expression is satisfied:

$0.002<|Sag|/h<0.05$ where Sag is a sag amount, which is a distance between the aspherical surface and a paraxial reference spherical surface in an optical axis direction at a maximum effective ray height and h is a maximum effective ray height on the aspherical surface.

23. A manufacturing method for a zoom lens having, in order from an object, a first lens group having negative refractive power, a second lens group having positive refractive power, and a third lens group having positive refractive power,
the method comprising the steps of:
disposing as the second lens group at least two positive lenses having an aspherical surface respectively, including at least one positive lens having an aspherical surface which satisfies the conditional expression vd>70 where vd is an Abbe number; and
disposing the first to the third lens groups so that the distance between the first lens group and the second lens group, and the distance between the second lens group and the third lens group can be changed; and wherein the following conditional expression is satisfied:

$0.03<Dm3/f3<0.20$ where Dm3 is a moving distance of the third lens group upon zooming from a wide-angle end state to a telephoto end state
and f3 is a focal length of the third lens group.

* * * * *